United States Patent [19]

Wagner

[11] Patent Number: 4,700,849

[45] Date of Patent: Oct. 20, 1987

[54] COMBINATION WINE RACK AND GLASS RETENTION/DISPENSING ASSEMBLY

[76] Inventor: Leonard A. Wagner, 1903-B Peppertree St., Durham, N.C. 27705

[21] Appl. No.: 4,869

[22] Filed: Jan. 20, 1987

[51] Int. Cl.⁴ .............................................. A47F 7/28
[52] U.S. Cl. ....................................... 211/71; D7/71; 211/74; 211/113
[58] Field of Search ................... 211/74, 75, 113, 118, 211/71, 94.5; D7/71

[56] References Cited

U.S. PATENT DOCUMENTS

| | | | |
|---|---|---|---|
| D. 269,926 | 8/1983 | White | D7/71 X |
| D. 273,446 | 4/1984 | Rankin et al. | D7/71 X |
| 2,005,939 | 6/1935 | Hibbard | 211/74 |
| 3,365,068 | 1/1968 | Crosby | 211/74 |
| 4,019,638 | 4/1977 | Miller | 211/113 X |
| 4,023,681 | 5/1977 | Plant | 211/74 |
| 4,325,486 | 4/1982 | Neal | 211/74 X |
| 4,424,907 | 1/1984 | Robb | 211/118 X |

OTHER PUBLICATIONS

1986 Christmas Catalogue, Bruce Bolind Division of Bolind, Inc. p. 30.
Autumn, 1986 Catalogue of Cooking Tools and Gourmet Gadgets, vol. XI, No. 4 published by Wooden Spoon, Inc. p. 24.
The Crate and Barrel Catalogue Fall and Winter, 1986 published by Crate and Barrel P.O. Box 3057, Northbrook, Ill. 60065 pp. 4 and 5.

Primary Examiner—Robert W. Gibson, Jr.
Attorney, Agent, or Firm—Steven J. Hultquist

[57] ABSTRACT

A combination wine rack and glass retention/dispensing assembly for glasses of a type having a stem attached to a generally planar base. The assembly comprises a main housing with front, rear, and side walls, in which the front and rear walls have bottle-receiving openings therein to accommodate bottles in a substantially horizontal position. An L-shaped member with web and foot portions is joined at an upper end of its web to a side wall, with its foot laterally inwardly extending from a lower end of the web. A second member, which may be of L- or inverted T-shape, is joined at an upper end of its web to lower ends of the front and rear walls in laterally spaced, substantially parallel relationship to the L-shaped member joined to the side wall, with a foot of the second member extending toward the inwardly facing foot of the L-shaped member, to cooperatively therewith form a track for retention and dispensing of glasses positionable in the track in an inverted orientation, with the respective feet of the L-shaped and second members of the track supporting the base(s) of retained glass(es) in such orientation. The assembly comprises means associated with at least one of the walls of the enclosure, for joining the assembly to an overlying horizontal surface, such as the bottom surface of an overhead cabinet.

12 Claims, 6 Drawing Figures

COMBINATION WINE RACK AND GLASS RETENTION/DISPENSING ASSEMBLY

BACKGROUND OF THE INVENTION

1. Field of the Invention

This invention relates to a combination wine rack and glass retention/dispensing assembly.

2. Description of the Related Art

In the field of consumer appliances, there has in recent years been a trend toward providing various appliances and consumer goods in modularized configurations amenable to mounting on the bottom surfaces of overhead cabinets in kitchen, office, and similar environments.

Such cabinet-mounted appliances and consumer goods include the Black & Decker Spacemaker TM Counter Bright TM can opener model ECL80, the Rival Cutabove TM Under Cabinet Food Prep Center model 6000 food processor, the Black & Decker Spacemaker TM portable mixer model SPM50, the Cosmo "Under-The-Cabinet" digital alarm clock, the General Electric Spacemaker TM, under the cabinet color television with FM/AM radio, and the Mr. Coffee TM Under Cabinet Drip Coffee Maker model UPC-300. The factors giving impetus to this trend have included the reduction in size of various such appliances and consumer goods as a result of the use of microcircuitry or other design improvements, and the desire to impart a sleek, ordered look to kitchens, office spaces, and other locations in which overhead cabinets or similar overhead structures accommodating mounting of such apparatus may be employed.

Another trend in recent years has been the proliferating consumption of wine, particularly premium wine, in the United States. As a consequence, it has become common practice to employ as household articles small-sized wine racks accommodating one or more bottles of wine for storage in a generally horizontal position, preferrably with the necks of the bottles slightly downwardly oriented to keep the corks therein in contact with the wine. A large variety of such portable wine racks, constructed of various materials such as wood, metal, rattan, plastic and the like, have been commercialized.

Associated with such consumption of wine is the use of stemware glasses, i.e., glasses of the type having a stem attached at one end to the liquid receptacle and at the other end to a generally planar base. In restaurants, bars, and the like, it has become a common practice to utilize glass racks for such stemware, by which the stemware is retained in an inverted position within slotted tracks formed by spaced-apart convergingly arranged flange elements on which the generally planar base of the invertedly positioned glass is supported. Such glass racks are frequently suspended from ceiling mounts by means of chains, such the Hanging Glass Rack commercially available as item 541486JT from Best Products Company, Inc., Roanoke, Va.

Another type of stemware rack of similar construction is the Stemware Spacesaver racks available as items number D2024A and D2024B from Bruce Bolind, Boulder, Colo., such racks being adapted to mount underneath a portion of a cupboard shelf inside of a cabinet, or under a cabinet itself.

A wine rack adapted to mount under a refrigerator shelf to store a single bottle of wine is shown at page 24 of the Autumn 1986 Catalog of Cooking Tools and Gourmet Gadgets, Volume X1, No. 4, published by Wooden Spoon ®, Inc.

A combined wine and glass rack is described on page 5 of The Crate and Barrel Catalog, Fall and Winter 1986, published by The Crate and Barrel, Northbrook, Ill. This wine and glass rack assembly is a free-standing unit whose top wall retains stemware in an inverted position, above a series of vertically spaced-apart wine rack rows extending between the side walls of the unit.

Although a multiplicity of wire racks and stemware storage units have been developed and commercialized to date, there exists a continuing need for improved modularized wine rack and stemware storage devices.

Accordingly, it is an object of the present invention to provide a combination wine rack and glass retention/dispensing assembly of a simple, unitary design, which may be mounted on the bottom surface of an overhead cabinet, or similar generally horizontal mounting surface.

Other objects and advantages will be more fully apparent from the ensuing disclosure and appended claims.

SUMMARY OF THE INVENTION

The present invention relates to a combination wine rack and glass retention/dispensing assembly with a main housing including front, rear, and side walls. The front and rear walls feature openings to receive bottles having neck and base portions. The opening(s) in the front wall are in registry with corresponding opening(s) in the rear wall, to retain bottles therein in a substantially horizontal position, with the neck portion of the bottle protuding from a front opening, and with the base portion of the bottle protuding from the rear opening in registry with such front opening.

Means are associated with at least one of the walls of the housing, for joining the assembly to an overlying, generally horizontal surface.

An L-shaped member, with web and foot portions, is joined at an upper end of its web to a lower end of an aforementioned side wall, and extends from the front wall to the rear wall, with its foot inwardly laterally extending from the web. A second member, with web and foot portions, is joined at an upper end of its web to lower ends of the front and rear walls in laterally spaced, substantially parallel relationship to the L-shaped member joined to the aforementioned side wall, and with a foot of the second member laterally extending toward the L-shaped member. In such fashion, the L-shaped member and the second member cooperatively form a track for retention and dispensing of glasses having a stem attached to a generally planar base, in which the glass is positionable in an inverted orientation. The feet of the L-shaped member and the second member forming the track thus support the retained glass(es) in such inverted orientation.

In various embodiments of the invention as above broadly described, the second member may be L-shaped or alternatively of inverted T-shape. In a particularly preferred embodiment, the assembly comprises first L-shaped members on each of the side walls, and at least one second member of inverted T-shape therebetween, forming at least two of such tracks for retention and dispensing of glasses.

Other aspects, features, and embodiments of the invention as generally described above, are set forth hereinafter.

DETAILED DESCRIPTION OF THE INVENTION, AND PREFERRED EMBODIMENTS THEREOF

Figure 1:
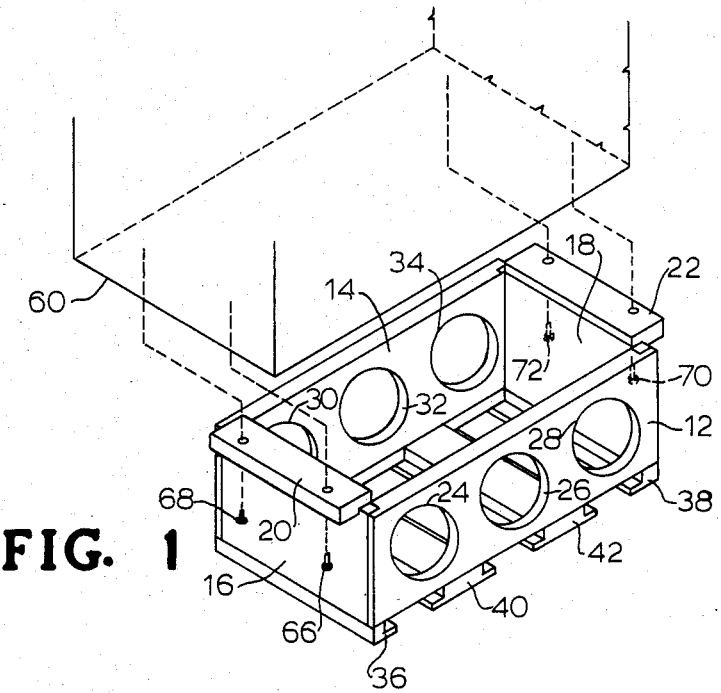
FIG. 1 is a perspective view of the combination wine rack and glass retention/dispensing assembly according to one embodiment of the invention, showing the mode of attachment of same to an associated mounting surface.
Figure 2:
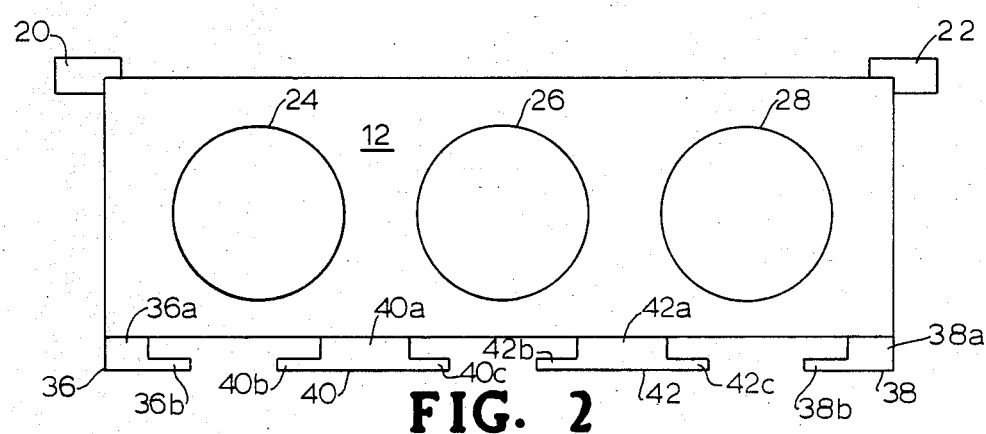
FIG. 2 is a front elevation view of the wine rack of FIG. 1.

Referring now to the drawings, FIGS. 1–6 hereof show an illustrative combination wine rack and glass retention/dispensing assembly, according to one embodiment of the present invention.

All assembly elements in these respective drawings are numbered correspondingly.

With specific reference to FIG. 1, the combination wine rack and glass retention/dispensing assembly 10 comprises a main housing comprising front wall 12, rear wall 14, and side walls 16 and 18. The front and rear walls may be joined to the side walls in any suitable manner, such as by mechanical fasteners, e.g. nails, screws, and the like, adhesive bonding, dovetailed construction, etc., or any combination of such fastening modes. Alternatively, the housing comprising the front, rear and side walls may be integrally formed, as where the housing is formed of a metal, or a plastic material, e.g., polycarbonate, polystyrene, polyvinylchloride, and the like, which may be molded, cast or otherwise integrally formed to yield the housing structure.

Figure 6:
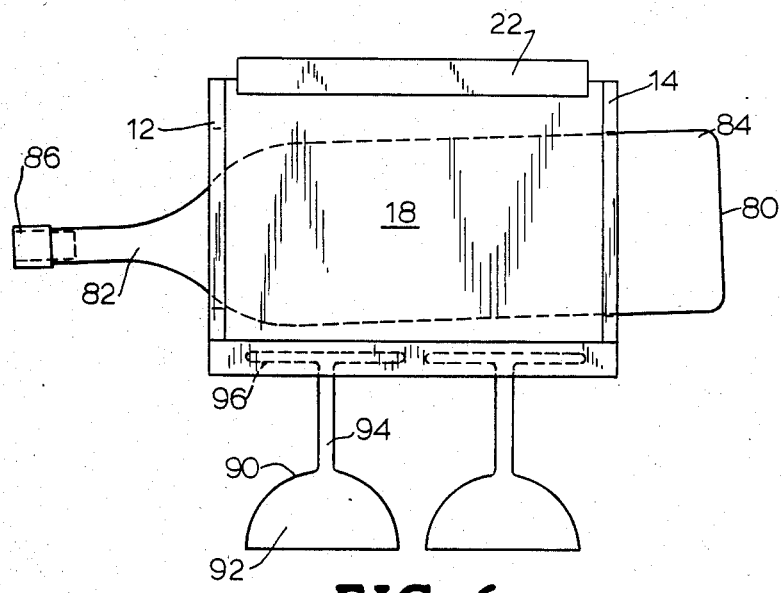
FIG. 6 is an end elevation view of the FIG. 1 wine rack.

The front wall 12 of the housing features a series of spaced-apart bottle-receiving openings 24, 26 and 28 therein. The rear wall 14 is similarly constructed with a series of corresponding openings 30, 32 and 34 therein, so that the openings in the front wall are in registry with corresponding openings in the rear wall, i.e., with opening 24 in registry with opening 30, opening 26 in registry with opening 32, and opening 28 in registry with opening 34. In such manner, each pair of registered openings accomodates and retains a wine bottle therein in a substantially horizontal position, as more clearly shown in FIG. 6 showing wine bottle 80 retained in the openings 28 and 34 of the front and rear walls 12 and 14, respectively. The bottle is reposed in a substantially horizontal position in the wine rack and glass retention/dispensing assembly, with the bottle neck 82 protuding from the front wall opening 28 and the bottle base portion 84 protuding from the rear wall opening 34.

For ease of construction, the respective registered openings in the front and rear walls may be substantially identically sized. This has a practical advantage, in addition to facilitating construction, in that the frontal wall openings thereby are sized and oriented to position the tapered neck wine bottle at a slight downward orientation at its neck relative to its base portion. By such orientation, liquid is retained in contact with the cork 86, so that the cork does not dry out. As is well known to vinophiles, storage of wine bottles in a substantially horizontal position with the neck portion slightly downwardly oriented to maintain the cork in a position wetted by the wine is highly preferred, since otherwise the cork may dry out or otherwise lose its sealing capability and admit environmental contaminants, e.g., spores or bacteria, which may "turn" the wine, rendering it useless for consumption.

Joined to the upper ends of each of the side walls of the housing is an outwardly extending mounting flange, comprising mounting flange 20 on side wall 16 and mounting flange 22 on side wall 18. The outwardly extending mounting flanges may employ openings, e.g., openings 52 and 53 in mounting flange 20 and openings 64 and 65 in mounting flange 22, through which mounting screws 66, 68, 70, and 72 may be respectively inserted for mounting of the wine rack and glass retention/dispensing assembly against the underside of the mounting surface 60, into which the mounting screws 66, 68, 70 and 72 are driven.

Means of mounting other than those illustrated may be utilized in connection with the housing of the assembly. For example, a mounting bracket could be joined to an upper portion of a single wall of the housing for joining the assembly to an overlying horizontal surface, provided that such bracket suitably accommodates the weight of the assembly when filled with wine bottles and glasses and maintains the structural integrity of the assembly is use.

In addition, the outwardly extending mounting flanges could be attached to the front and rear walls of the housing, rather than the side walls as shown, or mounting flanges of such type could be employed on all four walls of the housing.

It will therefore be recognized that numerous variations of mounting means may be employed, for example simple mounting screws driven through the overhead mounting element and into the upper ends of the housing wall(s). Accordingly, the mounting means of the present invention are intended to be broadly construed to encompass such mounting configurations and means, as well as all others by which the housing may be attached to an overlying mounting surface.

At the lower end of side wall 16 is joined L-shaped member 36 having a web portion 36a and a foot, or leg, portion 36b, the L-shaped member being joined to the side wall lower end at the upper end of web 36a. The L-shaped member extends longitudinally from the front wall to the rear wall of the housing (see FIGS. 4 and 5) with its foot 36b extending laterally inwardly from the web 36a.

In like manner, L-shaped member 38, comprising a vertical web portion 38a and an inwardly laterally extending foot portion 38b is joined at the upper end of web 38a to the lower end of side wall 18, thereby depending from the side wall and extending from the front wall to the rear wall of the housing.

The assembly further comprises inverted T-shaped members 40 and 42. Member 40 comprises a web portion 40a, from the lower portion of which outwardly extend respective foot portions 40d and 40c. Member 42 is similarly formed, with a vertical web 42a and integrally formed foot portions 42b and 42c extending horizontally therefrom in opposite directions, as shown. Each of the inverted T-shaped member 40 and 42 is joined at an upper end of its respective web 40a, 42a to lower ends of the front wall 12 and rear wall 14, in laterally spaced-apart, substantially parallel relationship to each another and to the aforementioned L-shaped members 36 and 38 on side walls 16 and 18, respectively.

By such construction, the foot 40b of inverted T-shaped member 40 extends laterally toward the foot 36b of L-shaped member 36, to cooperatively form therewith a track for retention and dispensing of glasses. This is more clearly shown in FIG. 6, wherein a wine glass 90, having a stem 94 joining the liquid receptacle 92 to the substantially planar base 96, is reposed in the track defined by L-shaped member 38 and inverted T-shaped member 42. The base of the glass is positionable in the track in an inverted orientation, with foot 42c of inverted T-shaped member 42 and foot 38b of L-shaped member 38, supporting the base of the retained glass in such orientation.

Figure 3:
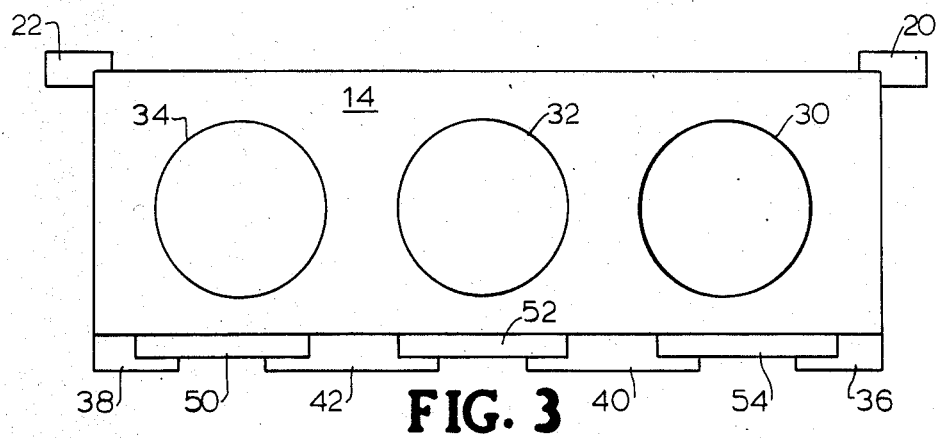
FIG. 3 is a rear elevation view of the wine rack of FIG. 1.
Figure 4:
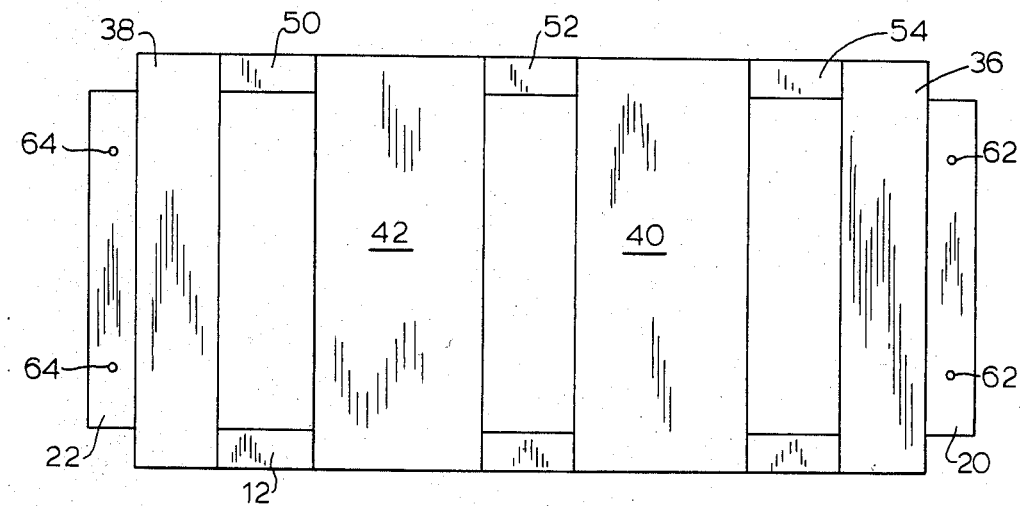
FIG. 4 is a bottom plan view of the FIG. 1 wine rack.
Figure 5:
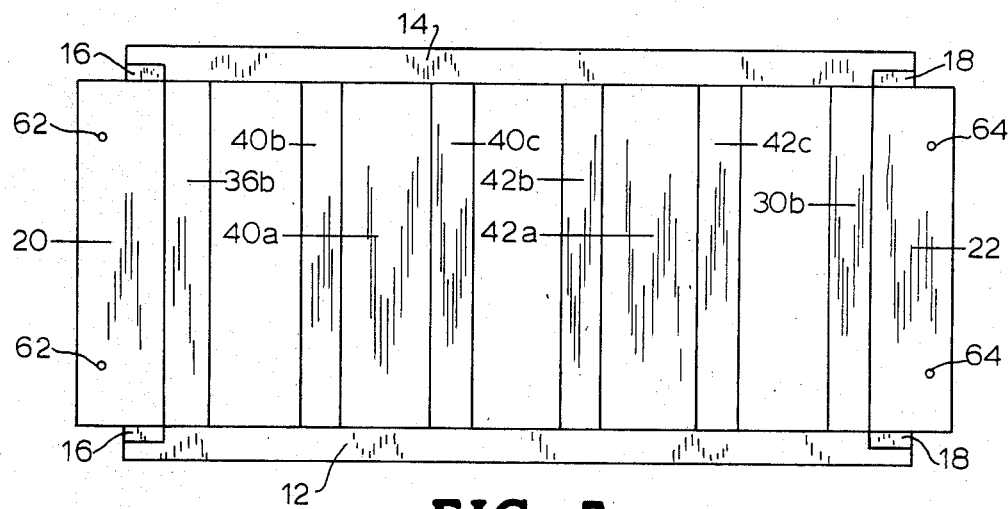
FIG. 5 is a top plan view of the FIG. 1 wine rack, showing the details of its interior construction.

The inverted wine glasses are further retained in the tracks, formed respectively between L-shaped member 36, inverted T-shaped member 40, inverted T-shaped member 42, and L-shaped member 38, by respective stops 50, 52 and 54, as most clearly shown in FIGS. 3 and 4.

In order to provide a suitable contact area for the attachment of the L-shaped and inverted T-shaped members to the housing and to concomitantly provide a close fit of the substantially planar bases of the stemware in the aforementioned tracks, it is generally desirable that each of the L and inverted T-shaped members has a web whose width, i.e., horizontal dimension, is greater than its height, i.e., the vertical dimension from the top of the web to its intersection with the foot of such member. Most preferably, based on such considerations, the web of each L- and inverted T-shaped member has a width which is at least two times its height.

The L- and inverted T-shaped members may be joined to the associated walls of the assembly housing in any suitable manner, or alternatively be integrally formed with the walls, as previously described with reference to the joining or integral formation of the housing walls.

In the embodiment of the invention shown in FIGS. 1-6 herein, three bottle-retaining openings are provided in the respective front and rear walls of the assembly housing. It will be recognized, however, that greater or lesser numbers of paired openings may be provided in the respective front and rear walls, as desired. A preferred form of the invention includes from two to five bottle-retaining openings in each of the front and rear walls of the housing, to provide a compact, unitary construction for such assembly.

It is also recognized that a number of assemblies according to the invention may be mounted in side-by-side relationship to one another, for greater storage capacity of bottles and glasses, and that for such purpose, it may advantageous to provide the housing with suitable locking or connection means whereby adjacently positioned assemblies may be coupled to one another to form a composite, or aggregate, structure.

Similarly, although the embodiment of the invention illustratively shown in FIGS. 1-6 hereof features three glass-retaining tracks, it is within the purview of the invention to utililize a greater or lesser number of such tracks, as may be necessary or desirable in a given application. For example, a single track could be provided by an L-shaped member associated with one of the housing side walls, in facing relationship to an adjacent, complimentarily-oriented, L-shaped member attached to the front and rear walls of the housing, i.e., with the respective feet of the L-shaped members extending toward one another.

As indicated with respect to the housing, the wine rack and glass retention/dispensing assembly of the present invention may be formed of any suitable material, such as wood, metal, plastics, rattan and the like, as well as suitable combinations of such materials. When the assembly is formed of plastics or metal materials which may be cast, molded or otherwise integrally formed, the entire assembly may be formed as an integral structure, in like manner to the housing portion thereof as previously described, or the assembly may be formed of separate component parts which may be joined in any suitable manner, such as previously described in connection with the housing of the assembly.

While preferred embodiments of the invention have been shown and described, it will be apparant that other variations, modifications and embodiments of the invention are possible, and accordingly all such variations, modifications and embodiments are to be regarded as being within the spirit and scope of the invention.

What is claimed is:

1. A combination wine rack and glass retention/dispensing assembly, comprising:
   (a) a main housing comprising front, rear, and side walls, said front and rear walls having openings therein to receive bottles having neck and base portions, the openings(s) in said front wall being in registry with corresponding opening(s) in said rear wall, to retain bottles therein in a substantially horizontal positions, with said neck portion protruding from a front opening and said base portion protruding from a rear opening in registry with said front opening;
   (b) an outwardly extending mounting flange joined to an upper end of at least one of said walls of said housing, for fixedly mounting the assembly against an overlying horizontal surface;
   (c) an L-shaped first member having web and foot portions, joined at an upper end of its web to a lower end of a said side wall, and extending from said front wall to said rear wall, with its foot inwardly laterally extending from a lower end of said web;
   (d) a second member having web and foot portions, and a shape selected from the group consisting of L-shape and inverted T-shape, joined at an upper end of its web to lower ends of said front and said rear walls in laterally spaced substantially parallel relationship to said L-shaped first member joined to said side wall, and with a foot of said second member laterally extending from a lower end of said second member web toward said L-shaped first member, to cooperatively form therewith a track for retention and dispensing of glasses having a stem attached to a generally planar base, in which the glass is positionable in said track in an inverted orientation, with the feet of the L-shaped first member and said second member forming said track supporting the retained glass(es) in said inverted orientation; and
   (e) a stop element in said track at said rear wall.

2. An assembly according to claim 1, wherein said second member is L-shaped.

3. An assembly according to claim 1, wherein said second member is of inverted T-shape.

4. An assembly according to claim, 1, comprising said L-shaped members on each of said side walls, and at least one second member of inverted T-shaped therebetween, to form at least two of said tracks for retention and dispensing of glasses.

5. An assembly according to claim 1, comprising an outwardly extending mounting flange joined to an upper end of each of said side walls.

6. An assembly according to claim 1, constructed of materials selected from those of the group consisting of woods, metals, plastics, and rattan, and combinations thereof.

7. An assembly according to claim 1, wherein the registered openings in the front and rear walls are substantially identically sized.

8. An assembly according to claim 1, wherein the front wall openings are sized and oriented to position a tapered neck bottle at a slight downward orientation at its neck relative to its base.

9. An assembly according to claim 4, having from two to five bottle-receiving openings in each of said front and rear walls.

10. An assembly according to claim 4, having from two to five tracks for retention/dispensing of glasses.

11. An assembly according to claim 1, wherein each of said first and second members has a web with a width greater than its height.

12. An assembly according to claim 11, wherein the web of each of said first and second members has a width which is at least 2 times its height.

* * * * *